(12) United States Patent
Lee (10) Patent No.: US 8,307,084 B1
(45) Date of Patent: Nov. 6, 2012

(54) METHOD AND SYSTEM FOR PROVIDING LOCK-DOWN COMMUNITIES COMPRISING A PLURALITY OF RESOURCES

(75) Inventor: Jaushin Lee, Saratoga, CA (US)

(73) Assignee: Imera Systems, Inc., San Jose, CA (US)

( * ) Notice: Subject to any disclaimer, the term of this patent is extended or adjusted under 35 U.S.C. 154(b) by 420 days.

(21) Appl. No.: 12/368,301

(22) Filed: Feb. 9, 2009

Related U.S. Application Data (60) Provisional application No. 61/065,513, filed on Feb. 14, 2008.

(51) Int. Cl.
*G06F 15/173* (2006.01)

(52) U.S. Cl. ............... 709/225; 726/3; 726/21; 726/23; 726/25

(58) Field of Classification Search ............... 726/3, 21, 726/23, 25
See application file for complete search history.

(56) References Cited

U.S. PATENT DOCUMENTS

| | | | |
|---|---|---|---|
| 7,032,022 B1 | 4/2006 | Shanumgam et al. | |
| 7,278,142 B2* | 10/2007 | Bandhole et al. | 718/104 |
| 7,376,898 B1* | 5/2008 | Yehuda et al. | 715/741 |
| 7,568,236 B2* | 7/2009 | Gbadegesin et al. | 726/27 |
| 7,743,190 B2* | 6/2010 | Murayama et al. | 710/240 |
| 7,860,921 B2* | 12/2010 | Murrell et al. | 709/202 |
| 2003/0069958 A1 | 4/2003 | Jalava | |
| 2004/0230841 A1 | 11/2004 | Savini | |
| 2007/0143601 A1* | 6/2007 | Arroyo et al. | 713/166 |
| 2007/0169183 A1* | 7/2007 | Kipnis et al. | 726/9 |
| 2008/0016546 A1* | 1/2008 | Li et al. | 726/1 |
| 2008/0082664 A1* | 4/2008 | Popescu et al. | 709/226 |
| 2008/0282354 A1* | 11/2008 | Wobber et al. | 726/26 |
| 2009/0193503 A1* | 7/2009 | Shevehenko et al. | 726/4 |
| 2009/0222907 A1* | 9/2009 | Guichard | 726/17 |

* cited by examiner

*Primary Examiner* — Duyen Doan
(74) *Attorney, Agent, or Firm* — Dergosits & Noah LLP; Joyce Tom (57) ABSTRACT

Methods and systems are described for providing a lock-down community. In one aspect, a system comprises an indication handler component in a host node device managing a lock-down community of a computer node device, the lock-down community comprising a plurality of resources where the computer node device is configured to communicate only with a resource in the lock-down community via a network. The host node device hosts an operating system that maintains an approved resource list that identifies the plurality of resources in the lock-down community of the computer node device. The indication handler component is configured to receive an indication to update the approved resource list, wherein the indication identifies a target resource. The system also includes an update handler component configured to update the approved resource list based on the received indication, thereby modifying the lock-down community of the computer node device.

24 Claims, 5 Drawing Sheets

METHOD AND SYSTEM FOR PROVIDING LOCK-DOWN COMMUNITIES COMPRISING A PLURALITY OF RESOURCES

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

CROSS-REFERENCE TO RELATED APPLICATIONS

This application claims priority to a provisional application entitled "Virtual Data Center Secure Resource Control and Management Using Network Filtering Technology," Ser. No. 61/065,513, filed Feb. 14, 2008, and herein incorporated in its entirety by reference.

BACKGROUND

Many corporate enterprises collect and store important and sensitive business information and critical business applications in one or more central "locations" referred to as data centers. A data center typically comprises a plurality of computers, e.g., data servers, and/or virtual machines, collectively referred to as "computer" node devices. The computer node devices can be clustered physically and/or distributed, that is, they can reside in a single location or be distributed in several locations, communicatively coupled to one another by a network. Typically, access to a data center is restricted to authorized users and/or client devices. Thus, the data center and its internal network are typically protected by several layers of security that are implemented via network devices, e.g., gateway node devices, routers and switches, and internal firewalls.

In today's global economy, large corporate enterprises typically are required to maintain data centers throughout the world. The cost and effort associated with controlling and managing these global data centers can be daunting. For example, storage node devices, e.g., server farms, must be purchased and maintained throughout the world. In order to ease the burden of controlling and managing such resources, and to earn a higher return on their capital investments, global enterprises are consolidating global data centers, critical business applications, and data onto shared computer node devices, e.g., server node devices. Recently a new trend has been developing where enterprises rent computer resources from other resource owners in a so called "cloud computing" business model.

While consolidation reduces the management cost for controlling global resources, either owned or rented, it also presents new and serious security issues. For instance, when restricted resources, e.g., sensitive business applications and data, are placed together along with unrestricted resources on one or more shared node devices, users who are authorized to access the unrestricted resources, but unauthorized to access the restricted resources, can potentially gain access to the restricted resources because they reside in a shared node. To address this issue, restricted resources can be "locked-down" in a restricted computer node device that is accessible only to authorized users. Nevertheless, when such a strategy is adopted, the restricted node device cannot be shared, thus defeating the cost advantages gained from consolidation.

Moreover, when a renting enterprise is using rented computer node devices, the "lock-down" of such devices can be very difficult to implement as the rented computer node devices can be physically located remotely and the physical network management can be managed by the leasing company and not necessarily available to the renting enterprise.

Moreover, the security issues are further complicated for an enterprise that collaborates with other enterprises, vendors and/or customers who require access to some, but not all, of the business applications and data in a data center. In most cases, the access, which can be across and between enterprise domains, must be temporary and/or must change dynamically and on demand from day to day.

Currently, to address these security issues, enterprises rely on applications to provide security in terms of user access and privilege control, and/or on physical network infrastructure to permanently segregate access (e.g. VLAN and firewall). These approaches, however, are ineffective and/or cumbersome and do not fit into the newly developed business trend. For instance, in a fixed network infrastructure for security segregation, modifying access privileges requires an administrator to modify manually the network settings and configurations of the network node devices, which is very inefficient and is not on demand. Moreover, network segregation necessarily eliminates node device sharing, which compounds the inefficiency. In such an environment, it is very difficult, if not impossible, to implement policy based and "elastic" network segregation, which is integrated with user role based access control. As for using applications to provide security, when the number of applications is large, the burden on an administrator to check every feature of every application to ensure all potential security breaches are covered is unreasonable.

SUMMARY

Methods and systems and computer program products are described for providing lock-down communities comprising a plurality of resources. The methods, systems, and computer program products effectively provide a lock-down environment by controlling which destination network addresses and network ports can be accessed at a node device operating system level to control network access by a computer node device. In an embodiment, access privileges are implemented at the operating system level of the computer node device, as opposed to at the physical network device level, thereby enabling dynamic reconfiguration of access privileges for the computer node device to be implemented easily and quickly. In another embodiment, a similar approach is applied to a network node device, such as a switch or router, which connects to a plurality of computer node devices, when the network node device supports transport layer routing control. In this embodiment, the destination network addresses and network ports associated with a computer node device can be locked down at the transportation layer.

In one aspect, a system for providing a lock-down community comprises system components including an indication handler component in a host node device managing a lock-down community of a computer node device, the lock-down community comprising a plurality of resources including at least one of a computer node device and an application in a computer node device where the computer node device is configured to communicate only with a resource in the lock-down community via a network. The host node device hosts an operating system that maintains an approved resource list that identifies the plurality of resources in the lock-down community of the computer node device. The indication handler component is configured to receive an indication to update the approved resource list of the computer node device, wherein the indication identifies a target resource. The system also includes an update handler component in the host device configured to update the approved resource list based on the received indication, thereby modifying the lock-down community of the computer node device.

In another aspect of the subject matter disclosed herein, a system for providing a lock-down community comprises system components including a lock-down community manager component configured to determine a lock-down community of a computer node device, the lock-down community comprising resources including at least one of a computer node device and an application in a computer node device, wherein the computer node device is configured to communicate only with a resource in the lock-down community via a network. The system also includes a command handler component configured to generate a message including an indication identifying a target resource, the indication to update an approved resource list of the computer node device, the approved resource list maintained by an operating system hosted by a host node device managing the lock-down community of the computer node device, wherein the approved resource list identifies resources in the lock-down community of the computer node device. The system also includes a message handler component configured to send the message including the indication to the host node device, wherein the host node device is configured to receive the indication and to update the approved resource list thereby modifying the lock-down community of the computer node device.

In another aspect of the subject matter disclosed herein, a method for providing a lock-down community includes receiving by a host node device managing a lock-down community of a computer node device an indication to update an approved resource list maintained by an operating system hosted by the host node device. The approved resource list identifies a plurality of resources in a lock-down community of the computer node device, wherein each resource comprises at least one of a computer node device and an application in a computer node device, and the computer node device is configured to communicate only with a resource in the lock-down community via a network, and wherein the indication identifies a target resource. The method also includes updating the approved resource list based on the received indication thereby modifying the lock-down community of the computer node device.

In another aspect of the subject matter disclosed herein, another method for providing a lock-down community includes determining a lock-down community of a computer node device, the lock-down community comprising resources including at least one of a computer node device and an application in a computer node device, where the computer node device is configured to communicate only with a resource in the lock-down community via a network. The method also includes generating a message including an indication identifying a target resource, the indication to update an approved resource list maintained by an operating system hosted by a host node device managing the lock-down community of the computer node device, wherein the approved resource list identifies resources in the lock-down community of the computer node device. The message including the indication is sent to the host node device, wherein the host node device is configured to receive the indication and to update the approved resource list thereby modifying the lock-down community of the computer node device.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

The subject matter presented herein allows a lock-down community of a computer node device to be created and/or reconfigured by controlling an approved resource list of the computer node device at the operating system level of a host node device managing the lock-down community of the computer node device. The host node device can be the computer node device itself or a network node device, e.g., a switch or a router, communicatively coupled to the computer node device. Because network access is controlled at the operating system level, as opposed to at a physical network device level, access privileges can be dynamically reconfigured easily and quickly. Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described. Various embodiments are described herein. The subject matter may be implemented using one of the embodiments described, any combination of the embodiments described including all of the embodiments, one of the embodiments described herein with other forms not described or any combination of the embodiments described including all of the embodiments with other forms not described.

According to an embodiment, a lock-down community of a computer node device comprises a group of network addressable resources, including computer node devices and/or applications running on a computer node device. The computer node device is allowed to communicate only with resources in the lock-down community. That is, the computer node device can send or receive communications only to or from a resource in its lock-down community.

The lock-down community is typically implemented by configuring the access rules of gateway and network nodes, e.g., routers and switches, to restrict physical network traffic to and from the resources. While a lock-down community is highly desirable, for example, when access to sensitive personnel and business information must be restricted and controlled, it can also be unduly restrictive and inflexible when resources must be added or removed. Adding or removing resources on demand to and from the lock-down community can be difficult because the access rules of the gateway and network nodes must be manually reconfigured by an administrator. In addition, because computer resources are physically segregated at the network level, computer nodes cannot be shared by resources outside of the lock-down community.

According to aspects of an embodiment described herein, a lock-down community is implemented by restricting and controlling with whom or what a computer node device can communicate at an operating system level of a host node device managing the lock-down community of the computer node device. In an embodiment, the host node device can be the computer node device itself. Alternatively or additionally, the host node device can be a network node device communicatively coupled to the computer node device. In an embodiment, an approved resource list of a computer node device is maintained at the operating system level of the host node device. The approved resource list of the computer node device includes, in one embodiment, network addresses and network ports of other resources, e.g., computer node devices and applications, in a lock-down community of the computer node device. The computer node device is allowed to communicate only with those resources, e.g., computer nodes and applications in nodes, associated with the network addresses and network ports on its approved resource list.

According to an embodiment, a lock-down service module hosted by a remote management node device can be communicatively coupled via a network to a lock-down service agent in the host node device, where the lock-down service agent is configured to control the approved resource list of the computer node device. The lock-down service module can be configured, in one embodiment, to determine which resources to include in the lock-down community of the computer node device. Based on that determination, the service module can be configured to generate a message that includes an indication to update the approved resource list of the computer node device. The message can then be sent to the lock-down service agent which can be configured to update the approved resource list based on the received indication. In this manner, the resources in the lock-down community of the computer node device can be easily and quickly modified on demand.

In an embodiment, the remote management node device can be communicatively coupled to a plurality of computer node devices and/or a plurality of network node devices, each being a host node device managing at least one lock-down community of at least one computer node device. In the manner described above, the lock-down service module in the remote management node device can determine the approved resources in the lock-down community of each of the computer node devices, and can seamlessly shuffle those resources by updating the approved resource lists of the computer node devices. Accordingly, a group of resources can be logically confined in a virtual lock-down community where computer node devices are allowed to receive and send communications only from and to resources on their respective approved resource lists.

Figure 1:
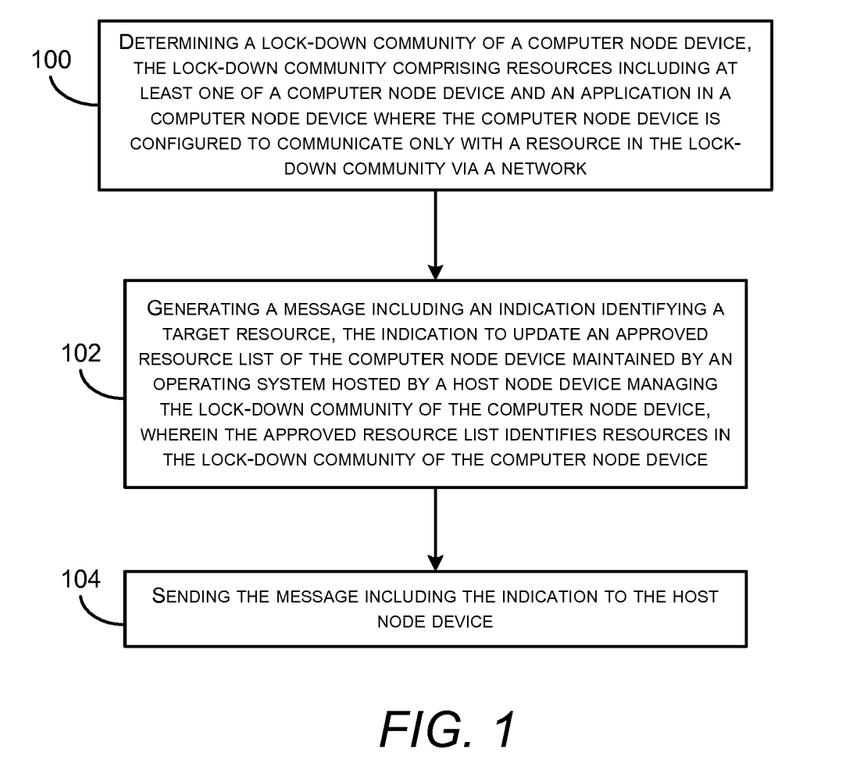
FIG. 1 is a flow diagram illustrating a method for providing a lock-down community according to an exemplary embodiment.
Figure 2:
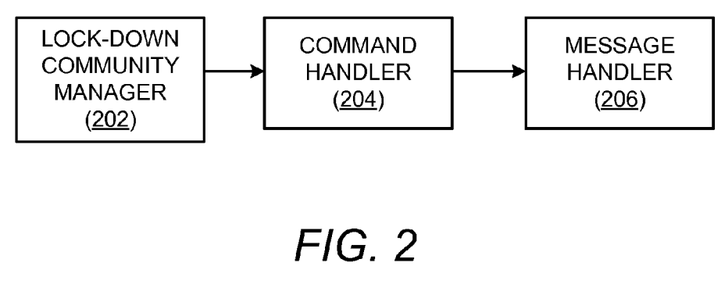
FIG. 2 is a block diagram illustrating a system for providing a lock-down community according to an exemplary embodiment.
Figure 3:
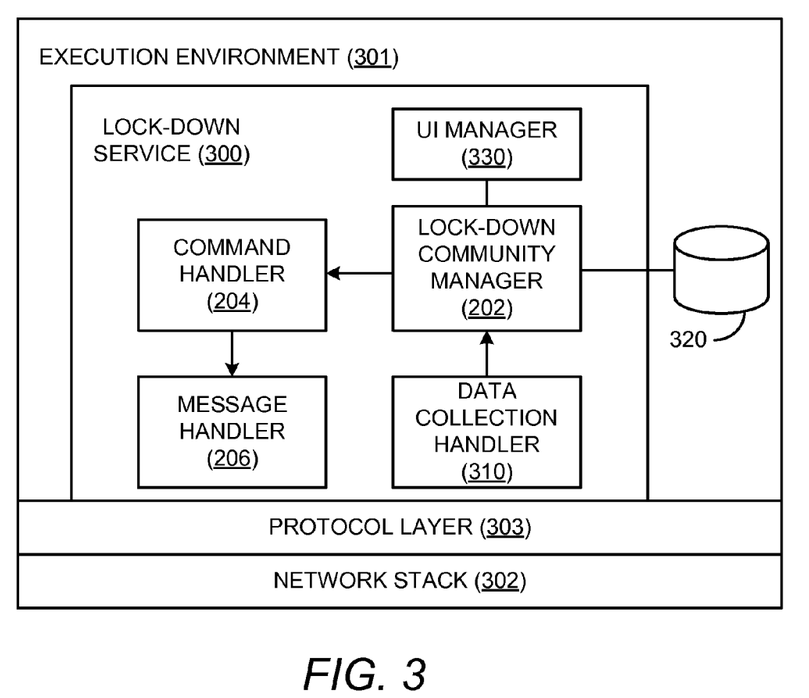
FIG. 3 is a block diagram illustrating another system for providing a lock-down community according to another exemplary embodiment.

FIG. 1 is a flow diagram illustrating a method for providing a lock-down community according to an exemplary embodiment. FIGS. 2 and 3 are block diagrams illustrating systems for providing a lock-down community according to embodiments of the subject matter described herein. In particular, FIG. 2 illustrates an arrangement of components configured to provide a lock-down community, while FIG. 3 illustrates the components of FIG. 2 and/or their analogs adapted for operation in an execution environment provided by a node device for providing a lock-down community. The method illustrated in FIG. 1 can be carried out by, for example, at least some of the components in each of the exemplary arrangements of components illustrated in FIGS. 2 and 3.

Figure 4:
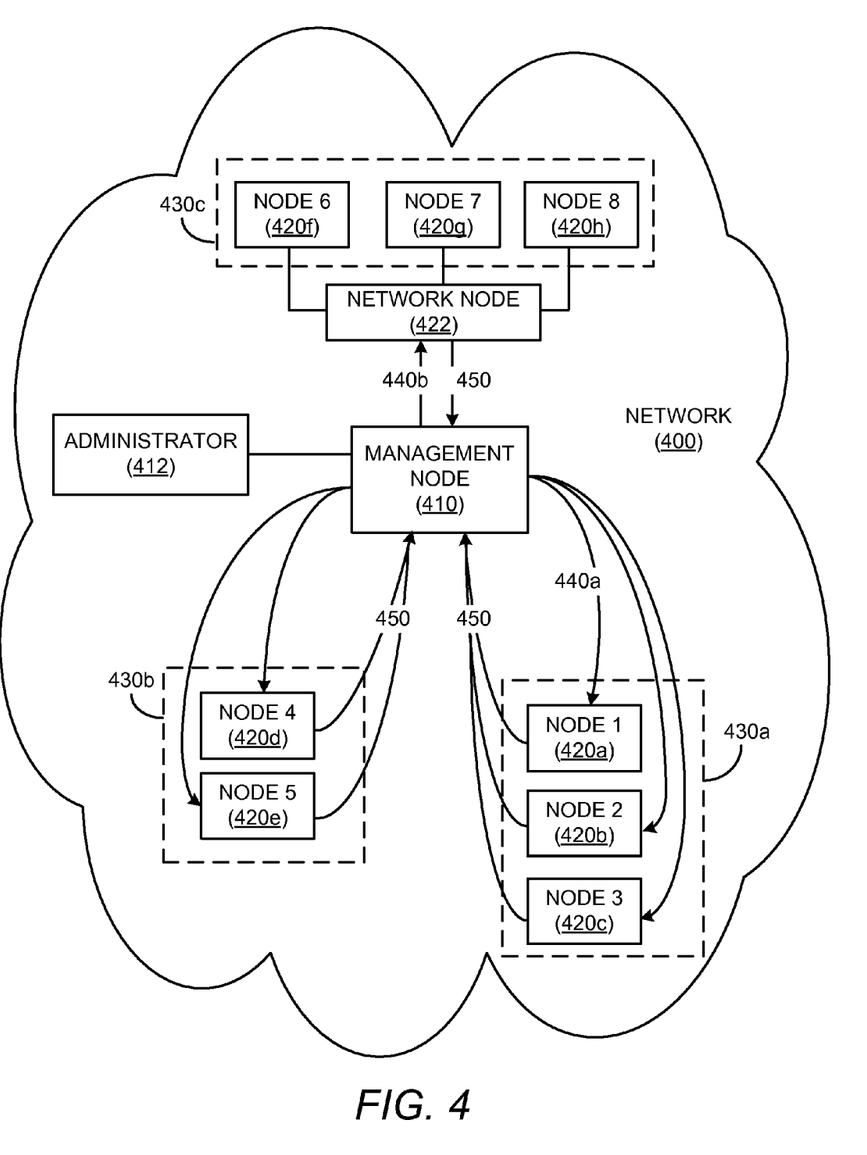
FIG. 4 illustrates a network in which a system for providing a lock-down community can be implemented.

FIG. 2 illustrates an arrangement of components that are configured to operate within an execution environment hosted by a node and/or multiple nodes, as in a distributed execution environment. For example, FIG. 4 illustrates a plurality of computer nodes devices 420a-420h and a network node device 422 (collectively referred to as node devices) communicatively coupled to a lock-down community management node 410 via a network 400. In an embodiment, the lock-down community management node 410 can be configured to provide an execution environment configured to support the operation of the components illustrated in FIG. 2 and/or their analogs. Exemplary computer node devices 420a-420h can include desktop computers, servers, notebook computers, PDAs, mobile phones, and digital image capture devices, and exemplary network node devices 422 can include switches and routers.

An execution environment can include a memory for storing components and an instruction processing component, such as processor and/or a digital signal processor (DSP), for processing instructions and any data associated with the operation of the components illustrated in FIG. 2. The components illustrated in FIG. 2, and functionally analogous components, each can require or otherwise make use of additional hardware and/or software subsystems according to their particular operational configurations. For example, a network subsystem can be included in the execution environment for enabling communication between nodes over the network 400. An operating system, a persistent data storage subsystem, a memory management subsystem, and/or a process scheduler are other examples of components that can be required for various adaptations of the components illustrated in FIG. 2 and their functional analogs for performing the method in FIG. 1.

Illustrated in FIG. 3 is a lock-down service 300 including the components illustrated in FIG. 2 adapted for operating in an execution environment 301. The execution environment 301, or an analog, can be provided by a node such as the management node 410. The lock-down service 300 can include a data collection handler component 310 for receiving information from the plurality of nodes 420a-420e, 422 via the network 400, and a data store 320 for storing node information and other configuration information. The information received from the plurality of nodes 420a-420e and 422 via the network 400 may include, but is not limit to, system information for each node device such as CPU utilization, memory utilization, and the like.

With reference to FIG. 1, in block 100 a lock-down community of a computer node device is determined where the lock-down community comprises a plurality of resources including at least one of a computer node device and/or an application in a computer node device, and where the computer node device is configured to communicate only with a resource in the lock-down community via a network. According to an embodiment, a system for providing a lock-down community includes means for determining a lock-down community of a computer node device. For example, FIG. 2 illustrates a lock-down community manager component 202 configured to determine a lock-down community of a computer node device, the lock-down community comprising resources including at least one of a computer node device and an application in a computer node device, wherein the computer node device is configured to communicate only with a resource in the lock-down community via a network.

In one embodiment, the lock-down community manager component 202 can be adapted for operation in the execution environment 301 provided by a node device such as the management node device 410, where the lock-down community manager component 202 can be included in the lock-down service component 300. The community manager component 202 can, in one embodiment, receive configuration information from an administrator 412 via a message over the network 400 or via a user interface manager component 330 in the lock-down service component 300. The configuration information can identify one or more resources to be included in the lock-down community of the computer node device. As used in this description, a resource can include computer node devices, and applications in a computer node device. Accordingly, a resource can be identified by a network address, e.g., IP address, and/or a network port.

Alternatively or additionally, the lock-down community manager component 202 can be configured to determine the lock-down community based on utilization information 450 from at least one of a plurality of computer node devices 420a-420h. The utilization information of a computer node device, e.g., Node 1 420a, can include the node's system information such as CPU utilization history and/or memory usage. According to an embodiment, utilization information 450 associated with at least one computer node device 420a-420h can be transmitted over the network 400 and received by a network stack 302 in the execution environment 301. The network stack 302 can be configured to provide the utilization information 450 to a communication protocol layer 303, which in turn can pass the information to a data collection handler component 310. In one embodiment, the data collection handler component 310 can be configured to organize the received utilization information 450 so that the lock-down community manager component 202 can analyze and store the information in the data store 320, and can modify the lock-down community of a computer node device based on the utilization information 450 of at least one of the computer node devices 420a-420h. In another embodiment, the lock-down community manager component 202 can be configured to present the utilization information 450 of the computer node devices 420a-420h to the administrator 412, who can then determine the lock-down communities of the computer node devices.

For example, referring to FIG. 4, a first lock-down community 430a of Node 1 420a includes Node 2 420b and Node 3 420c, while a second lock-down community 430b of Node 4 420d includes Node 5 420e. The lock-down community manager component 202 can receive utilization information 450 from Node 1 420a and from Node 4 indicating that Node 1 420a is idle, and Node 4 420d is operating at full capacity. Based on this information, the administrator 412 or the lock-down community manager component 202 can balance the work load by modifying the lock-down communities of both Node 1 420a and Node 4 420d so that the modified lock-down community of Node 1 420a includes Node 4 420d and Node 5 420e, and the modified lock-down community of Node 4 420d includes Node 1 420a. Accordingly, resources can be shuffled and redistributed on demand.

Referring again to FIG. 1, once the lock-down community of the computer node device is determined, in block 102 a message including an indication identifying a target resource is generated. The indication in the message, in an embodiment, is to update an approved resource list of the computer node device maintained by an operating system hosted by a host node device managing the lock-down community of the computer node device. The approved resource list identifies resources in the lock-down community of the computer node device. According to an embodiment, a system for providing a lock-down community includes means for generating a message including an indication identifying a target resource. For example, FIG. 2 illustrates a command handler component 204 configured to generate a message including an indication identifying a target resource, the indication to update an approved resource list of the computer node device, the approved resource list maintained by an operating system hosted by a host node device managing the lock-down community of the computer node device, wherein the approved resource list identifies resources in the lock-down community of the computer node device.

According to one embodiment, the command handler component 204 can be invoked when the lock-down community manager component 202 initially determines a lock-down community or when a lock-down community is to be modified, e.g., based on utilization information 450 received from the nodes 420a-420h. Alternatively or additionally, in the lock-down service 300, the command handler component 204 can be invoked when the lock-down community manager component 202 receives configuration information from the administrator 412.

In one embodiment, the command handler component 204 can be configured to generate a message formatted according to a variety of schemas that include the indication to update the approved resource list based on the target resource. For example, the indication can include a command to add or remove the target resource to or from the approved resource list of the computer node device when the lock-down community is being expanded or contracted, respectively. Alternatively or additionally, the indication can include a command to replace a first approved resource list associated with a first lock-down community with a second approved resource list associated with a second lock-down community comprising the target resource when, for instance, resources in the first lock-down community are being replaced with resources in the second lock-down community.

In the case when the first approved resource list is being replaced with the second approved resource list, the command handler component 204 can be configured to generate a second message that instructs the host node device, e.g., Node 1 420a or network node 422, to archive and/or purge information associated with the first lock-down community 430a before replacing the first approved list with the second approved resource list. For example, the second message can include an indication for the host node device to collect, organize and store data associated with the first lock-down community 430a. Another message can be generated that includes environmental setup instructions associated with the second lock-down community 430b. In addition, the command handler component 204 can be configured to generate additional messages to one or more host node devices managing the respective lock-down communities of each of the other computer node devices, e.g., Node 2 420b and Node 3 420c in the first lock-down community 430a, and Node 4 420d and Node 5 420e in the second lock-down community 430b. The addition messages can include a command to remove or add a target resource, i.e., Node 1 420a, from and to their respective approved resource lists.

Referring again to FIG. 1, once the message is generated, in block 104 the message including the indication is sent to the host node device, which is configured to receive the indication and to update the approved resource list thereby modifying the lock-down community of the computer node device. A system for providing a lock-down community includes means for sending the message to the host node device. For example, FIG. 2 illustrates a message handler component configured to send the message including the indication to the host node device, wherein the host node device is configured to receive the indication and to update the approved resource list thereby modifying the lock-down community of the computer node device.

The message handler component 206, in one embodiment, can be configured to send the message generated by the command handler component 204 to the host node device, e.g., Node 1 402a or network node 422, via the network 400 according to a suitable communication protocol, of which a large number exist or can be defined. The message can be provided to the protocol layer 303, which can be configured to package the message for sending. Such packaging can include reformatting the message, breaking the message into packets, including at least a portion of the message along with at least a portion of another message to be transmitted together, and/or adding additional information such as a header or trailer as specified by the protocol used.

Figure 5:
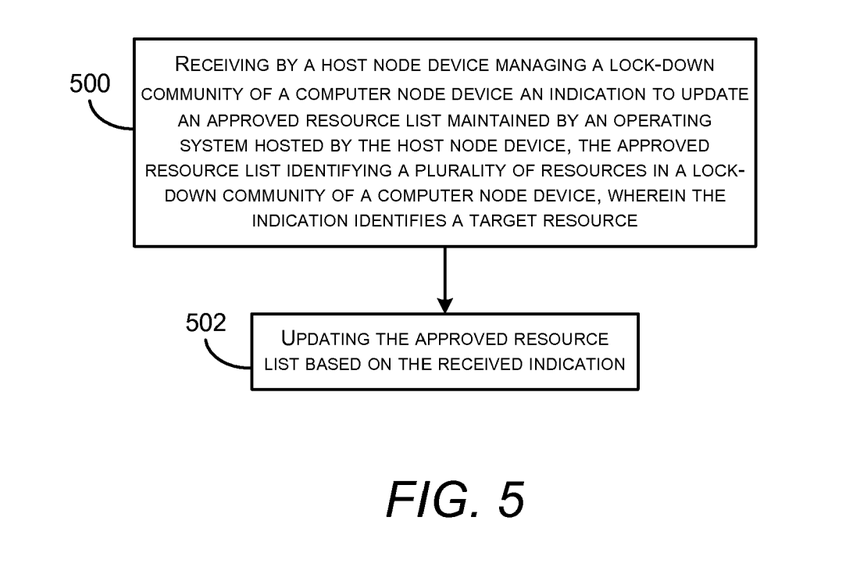
FIG. 5 a flow diagram illustrating another method for providing a lock-down community according to another exemplary embodiment.
Figure 6:
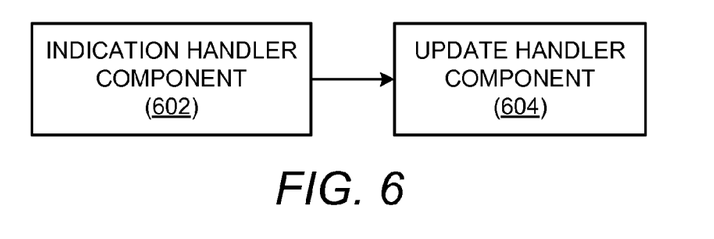
FIG. 6 is a block diagram illustrating a system for implementing the method of FIG. 5 according to an exemplary embodiment.
Figure 7:
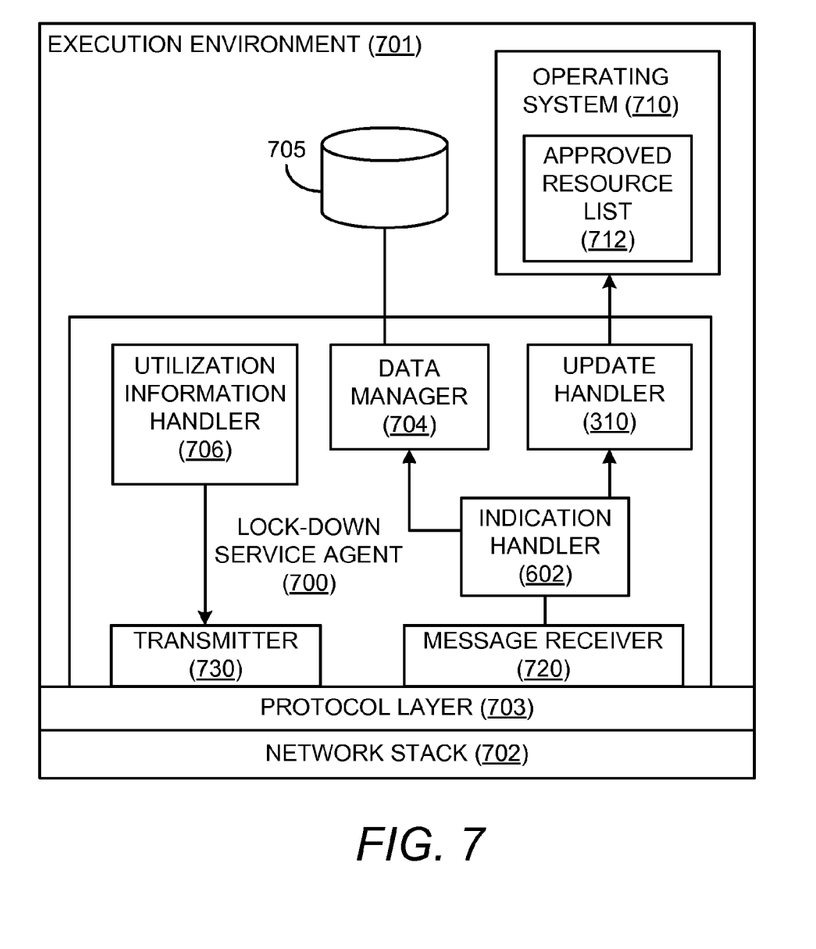
FIG. 7 is a block diagram illustrating another system for implementing the method of FIG. 5 according to another exemplary embodiment.
Figure 8:
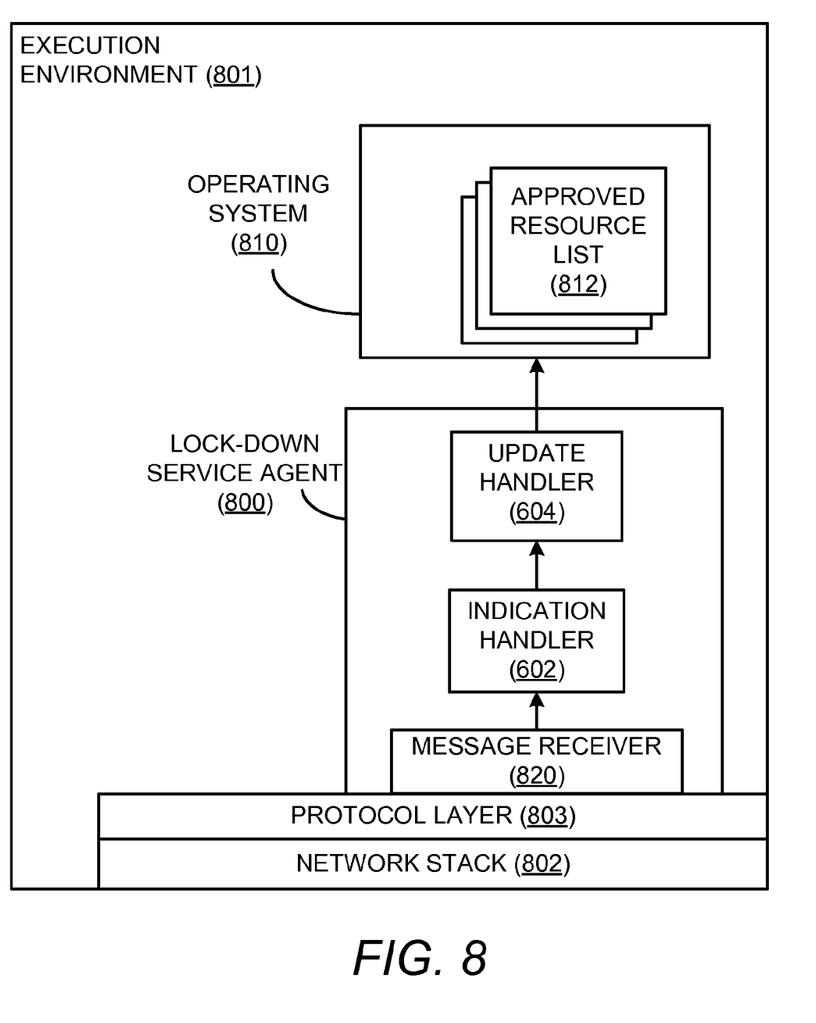
FIG. 8 is a block diagram illustrating another system for implementing the method of FIG. 5 according to another exemplary embodiment.

FIG. 5 is a flow diagram illustrating a method for providing a lock-down community according to another aspect of the subject matter described herein. FIGS. 6, 7, and 8 are block diagrams illustrating systems for providing a lock-down community according to other embodiments. In particular, FIG. 6 illustrates components configured for providing a lock-down community, while FIG. 7 and FIG. 8 illustrate the components of FIG. 6 and/or their analogs adapted for operation in execution environments provided by nodes for providing a lock-down community. The method illustrated in FIG. 5 can be carried out by, for example, at least some of the components in each of the exemplary arrangements of components illustrated in FIGS. 6, 7, and 8.

The components illustrated in FIG. 6 are configured to operate within an execution environment provided by a host node device and/or multiple host node devices. For example, in FIG. 4, host node devices can be computer node devices, e.g., 420a-420e, and/or a network node device 422, and can be configured to provide respective execution environments adapted to support the operation of the components illustrated in FIG. 6 and/or their analogs.

Illustrated in FIG. 7 is a lock-down service agent 700 including the components illustrated in FIG. 6 adapted for operating in an execution environment 701. In an embodiment, the execution environment 701, or an analog, can be provided by a computer node device, Node 1 420a, as the host node device. Alternatively or additionally, in FIG. 8, the components illustrated in FIG. 6 can be adapted for operation within a host node that provides an execution environment 801 hosting a lock-down service agent 800. The host node providing the execution environment 801, or an analog, can be a network node device 422, such as a switch or a router. The lock-down service agent 700, 800 operating in the computer node 420a or in the network node 422 can be configured to receive and send information from and to the management node 410 via the network 400 using any suitable communication protocol.

In one embodiment, each execution environment 701, 801 supports an operating system 710, 810 which maintains at least one approved resource list 712, 812. The approved resource list 712, 812 identifies a plurality of resources in a lock-down community of a computer node device 420a-420h. As mentioned above, a resource can include computer node devices, e.g., servers, virtual machines, desktop computers, and mobile devices, and applications in a computer node device. Accordingly, a resource can be identified by a network address, e.g., IP address, of a computer node and/or a network port associated with an application.

With reference to FIG. 5, in block 500 an indication to update an approved resource list maintained by an operating system hosted by a host node device managing a lock-down community of a computer node device is received by the host node device. The approved resource list identifies a plurality of resources in a lock-down community of a computer node device, where a resource comprises a computer node device and/or an application in a computer node device, and the computer node device is configured to communicate only with a resource in the lock-down community via a network. The indication to update the approved resource list identifies a target resource.

A system for providing a lock-down community includes means for receiving by a host node device managing a lock-down community of a computer node device an indication to update an approved resource list maintained by an operating system hosted by the host node device, wherein the indication identifies a target resource. For example, FIG. 6 illustrates an indication handler component 602 configured to receive an indication to update an approved resource list maintained by an operating system hosted by a host node device managing a lock-down community of a computer node device, the approved resource list identifying a plurality of resources in the lock-down community of the computer node device, wherein a resource comprises at least one of a computer node device and an application in a computer node device, and the computer node device is configured to communicate only with a resource in the lock-down community via a network and wherein the indication identifies a target resource.

In an embodiment, the indication handler component 602 can be adapted for operation in the execution environment 701 where the indication handler component 602 can be included in the lock-down service agent 700 in a computer node device, e.g., Node 1 420a, operating as the host device. In this embodiment, the execution environment 701 supports an operating system 710 which maintains an approved resource list 712 of the computer node device 420a. Exemplary operation systems 710 that maintain an approved resource list 712 are known in the art and commercially available.

Alternatively or additionally, the indication handler component 602 can be adapted for operation in the execution environment 801 where the indication handler component 602 can be included in the lock-down service agent 800 in a network node device 422, such as a switch or router, operating as the host device. In this embodiment, the network node device 422 can support an operating system 810 that maintains at least one approved resource list 812 for at least one computer node device 420f-420h for which the network node device 422 is configured to filter communications. For example, the network node device 422 can maintain an approved resource list 812 for a computer node device, e.g., Node 6 420f. In an embodiment, the approved resource list 812 can be analogous to an access control list (ACL) that defines transport layer access rules for the computer node device 420f. Exemplary network node devices 422 that support such operation systems are known in the art and commercially available.

According to an embodiment, the indication handler component 602 can be configured to receive the indication to update the approved resource list 712, 812 in a message 440a, 440b sent from the management node 410 over the network 400. According to an embodiment, the message 440a, 440b can be transmitted over the network 400 and received by a network stack 702, 802 in the execution environment 701, 801. The network stack 702, 802 can be configured to provide the message 440a, 440b to a communication protocol layer 703, 803, which in turn can pass the message to the indication handler component 602 via a message receiver component 720, 820 in the lock-down service agent 700, 800.

Referring again to FIG. 5, once the indication is received, in block 502 the approved resource list is updated based on the received indication thereby modifying the lock-down community of the computer node device. According to one embodiment, a system for providing a lock-down community includes means for updating the approved resource list based on the received indication thereby modifying the lock-down community of the computer node device. For example, FIG. 6 illustrates an update handler component 604 configured to update the approved resource list based on the received indication thereby modifying the lock-down community of the computer node device.

In an embodiment, when the indication handler component 602 receives the message 440a, 440b via the message receiver component 720, 820, the indication handler component 602 can be configured to determine that the message includes an indication to update the approved resource list 712, 812 of a computer node device 420a, 420f. In response, the indication handler component 602 can invoke the update handler component 604 to process the update indication.

According to an embodiment, the update indication can include a command to add or remove the target resource to or from the approved resource list 712, 812 when the lock-down community of the computer node device 420a, 420f is being expanded or contracted, respectively. Alternatively or additionally, the update indication can include a command to replace a first approved resource list associated with a first lock-down community, e.g., 430a, 430c, with a second approved resource list associated with a second lock-down community, e.g., 430b, comprising the target resource. According to an embodiment, the target resource can be identified by a corresponding network address and/or a network port.

The update handler component 604 can be configured to process the indication. In particular, it can be configured to add information identifying the target resource to the approve resource list 712, 812 when the target resource is added to the lock-down community of the computer node device 420a, 420f, and/or remove the target resource information from the list 712, 812 when the target resource is removed from the lock-down community of the computer node device 420a, 420f. Additionally, the update handler component 604 can be configured to replace a first list associated with a first lock-down community with a second list associated with a second lock-down community comprising the target resource information when, for example, resources in the first lock-down community are being replaced with resources in the second lock-down community.

In an embodiment, when the first approved resource list is being replaced with the second approved resource list, the indication handler component 602 can be configured to receive another indication to archive and/or purge data associated with the first lock-down community 430a. In this case, the indication handler component 602 can be configured to invoke a data manager component 704 (shown in FIG. 7) in the lock-down service agent 700. When invoked, the data manager component 704 can be configured, in an embodiment, to archive the data associated with a current, i.e., the first, lock-down community in a data store 705 supported by the execution environment 701.

According to another embodiment, the indication handler component 602 can also be configured to receive another indication from the management node 410 to collect utilization information associated with one or more computer node device(s) 420a, 420f-420h. In response to receiving such an indication, a utilization information handler component 706 (shown in FIG. 7) in the lock-down service agent 700 can be invoked. The utilization information handler component 706 can be configured to monitor utilization information, e.g., CPU and memory usage, of the computer node device(s) 420a, 420f-420h, and when invoked, can be configured, in one embodiment, to send the utilization information 450 to the management node 410. In one embodiment, the management node device 410 can be configured to receive the utilization information from a plurality of nodes 420a-420h and to present, analyze and/or store the information. In an embodiment, the utilization information can be used to manage resources between two or more lock-down communities 430a, 430b, 430c.

According to embodiments described herein, a lock-down community of a computer node device comprises a plurality of resources with which the computer node device is allowed to communicate. The lock-down community can be configured and reconfigured dynamically by updating an approved resource list maintained by the operating system of a host node device that manages the lock-down community of the computer node device. In an embodiment, the host node device can be the computer node device itself and/or a network node device communicatively coupled to the computer node device. Because the approach described does not require manual reconfiguration of network topology via network node devices, e.g., switches and routers, at a physical network level, a physical data center can be logically segregated into lock-down communities where communication within a community can be managed, and communication between communities can be effectively blocked. Advantageously, this simultaneously provides security and optimizes resource sharing.

According to an embodiment, the distribution of computer resources between two or more lock-down communities can be completely automated and dynamic, as opposed to an environment where the physical network infrastructure is permanently segregated. Thus, aspects of the subject matter described herein provide greater flexibility for security and resource sharing than traditional network segregation solutions such as virtual local access networks (VLANs) or access control lists (ACLs) on network switches and routers, coupled with firewalls and NAT devices.

It should be understood that the various system components (and means) defined by the claims and illustrated in the various block diagrams represent logical components that are configured to perform the functionality described herein. While at least one of these components are implemented at least partially as an electronic hardware component, and therefore constitutes a machine, the other components may be implemented in software, hardware, or a combination of the two. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function).

Other components may be implemented in software, hardware, or a combination of the two. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

To facilitate an understanding of the subject matter described above, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Moreover, the methods described herein can be embodied in executable instructions stored in a computer readable medium for use by or in connection with an instruction execution machine, apparatus, or device, such as a computer-based or processor-containing machine, apparatus, or device. As used here, a "computer-readable medium" can include one or more of any suitable media for storing the executable instructions of a computer program in one or more of an electronic, magnetic, optical, and electromagnetic, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for providing a lock-down community, the system comprising system components including:

an indication handler component in a host node device managing a lock-down community of a computer node device, the lock-down community comprising a plurality of resources including at least one of the computer node device, another computer node device, and an application in a the another computer node device, wherein the computer node device is configured to communicate only with a resource in the lock-down community via a network, the host node device hosting an operating system that maintains an approved resource list that identifies the plurality of resources in the lock-down community of the computer node device and allowing network traffic from the computer node device to only the plurality of resources on the approved resource list, the indication handler component configured to receive an indication to update the approved resource list, wherein the indication identifies a target resource; and an update handler component in the host node device configured to update the approved resource list based on the received indication, thereby modifying the lock-down community of the computer node device, wherein at least one of the system components includes at least one electronic hardware component.

2. The system of claim 1 wherein the target resource is identified by at least one of a network address and a network port.

3. The system of claim 1 wherein the host node device is the computer node device.

4. The system of claim 1 wherein the indication to update the list is included in a message sent from a management node device and received via a network, wherein the management node is coupled to a plurality of host node devices via the network.

5. The system of claim 4 further comprising a utilization monitor component in the host node device configured to monitor utilization information associated with the computer node device and to send the utilization information to the management node device, wherein the management node device is configured to receive utilization information from the plurality of host node devices, and to at least one of present, analyze, and store the utilization information.

6. The system of claim 1 wherein the update handler component is configured to at least one of add the target resource to the approved resource list, remove the target resource from the approved resource list, and replace a first approved resource list associated with a first lock-down community with a second approved resource list associated with a second lock-down community comprising the target resource.

7. The system of claim 6 wherein when the first approved resource list is replaced with the second approved resource list, the indication handler component is further configured to receive an indication to at least one of archive and purge information associated with first lock-down community, and the system further includes a data manager component in the host node device configured to archive the data associated with the first lock-down community.

8. A system for providing a lock-down community, the system comprising system components including:
 a lock-down community manager component configured to determine a lock-down community of a computer node device, the lock-down community comprising a plurality of resources including at least one of the computer node device, another computer node device, and an application in the another computer node device, wherein the computer node device is configured to communicate only with a resource in the lock-down community via a network;
 a command handler component configured to generate a message including an indication identifying a target resource, the indication to update an approved resource list of the computer node device, the approved resource list maintained by an operating system hosted by a host node device managing the lock-down community of the computer node device, wherein the approved resource list identifies resources in the lock-down community of the computer node device and wherein the host node device allows network traffic from the computer node device to only the resources on the approved resource list; and
 a message handler component configured to send the message including the indication to the host node device, wherein the host node device is configured to receive the indication and to update the approved resource list thereby modifying the lock-down community of the computer node device,
 wherein at least one of the system components includes at least one electronic hardware component.

9. The system of claim 8 wherein the target resource is identified by at least one of a network address and a network port.

10. The system of claim 8 wherein the host node device is the computer node device.

11. The system of claim 8 further comprising a data collection handler component configured to receive utilization information associated with a plurality of computer node devices, and wherein the lock-down community manager component is configured to analyze the utilization information, and to modify the lock-down community of the computer node device based on the utilization information.

12. The system of claim 8 wherein the indication to update the approved resource list of the computer node device includes a command to at least one of add the target resource to the approved resource list, remove the target resource from the approved resource list, and replace a first approved resource list associated with a first lock-down community with a second approved resource list associated with a second lock-down community comprising the target resource.

13. The system of claim 12 wherein when the indication to update includes a command to replace the first approved resource list, the command handler component is configured to generate a second message including an indication to at least one of archive and purge data associated with the first lock-down community, and the message handler component is configured to send the second message to the host node device.

14. A system for providing a lock-down community, the system comprising:
 means for receiving by a host node device managing a lock-down community of a computer node device an indication to update an approved resource list maintained by an operating system hosted by the host node device, the approved resource list identifying a plurality of resources in the lock-down community of the computer node device, wherein the host node device allows network traffic from the computer node device to only the plurality of resources on the approved resource list, wherein each resource comprises at least one of the computer node device, another computer node device, and an application in the another computer node device, and the computer node device is configured to communicate only with a resource in the lock-down community via a network, and wherein the indication identifies a target resource; and
 means for updating the approved resource list based on the received indication thereby modifying the lock-down community of the computer node device,
 wherein at least one of the means includes at least one electronic hardware component.

15. A system for providing a lock-down community, the system comprising:
 means for determining a lock-down community of a computer node device, the lock-down community comprising resources including at least one of the computer node device, another computer node device, and an application in the another computer node device, wherein the computer node device is configured to communicate only with a resource in the lock-down community via a network;
 means for generating a message including an indication identifying a target resource, the indication to update an approved resource list of the computer node device maintained by an operating system hosted by a host node device managing the lock-down community of the computer node device, wherein the approved resource list identifies resources in the lock-down community of the computer node device and wherein the host node device allows network traffic from the computer node device to only the resources on the approved resource list; and
 means for sending the message including the indication to the host node device, wherein the host node device is configured to receive the indication and to update the approved resource list thereby modifying the lock-down community of the computer node device,
 wherein at least one of the means includes at least one electronic hardware component.

16. A method for providing a lock-down community, the method comprising:
 receiving by a host node device managing a lock-down community of a computer node device an indication to update an approved resource list maintained by an operating system hosted by the host node device, the approved resource list identifying a plurality of resources in the lock-down community of the computer node device, wherein the host node device allows network traffic from the computer node device to only the plurality of resources on the approved resource list, wherein each resource comprises at least one of the computer node device, another computer node device, and an application in the another computer node device, and the computer node device is configured to communicate only with a resource in the lock-down community via a network and wherein the indication identifies a target resource; and updating the approved resource list based on the received indication thereby modifying the lock-down community of the computer node device, wherein at least one of the preceding actions is performed on at least one electronic hardware component.

17. The method of claim 16 wherein receiving the indication to update the approved resource list includes receiving a message including the indication from a management node device over a network, wherein the management node device is coupled to a plurality of host node devices via the network.

18. The method of claim 17 further including monitoring by the host node device utilization information associated with the computer node device, and sending the utilization information to the management node device, wherein the management node device is configured to receive utilization information from the plurality of host devices, and to at least one of present, analyze, and store the utilization information.

19. The method of claim 16 wherein updating the approved resource list of the computer node device includes at least one of adding the target resource to the approved resource list, removing the target resource from the approved resource list, and replacing a first approved resource list associated with a first lock-down community with a second approved resource list associated with a second lock-down community comprising the target resource.

20. The method of claim 19 wherein when the first approved resource list is replaced with the second approved resource list, the method further includes receiving an indication to at least one of archive and purge data associated with the first lock-down community, and at least one of archiving and purging the data associated with the first lock-down community.

21. A method for providing a lock-down community, the method comprising:

determining a lock-down community of a computer node device, the lock-down community comprising resources including at least one of the computer node device, another computer node device, and an application in the another computer node device, wherein the computer node device is configured to communicate only with a resource in the lock-down community via a network;

generating a message including an indication identifying a target resource, the indication to update an approved resource list of the computer node device maintained by an operating system hosted by a host node device managing the lock-down community of the computer node device, wherein the approved resource list identifies resources in the lock-down community of the computer node device and wherein the host node device allows network traffic from the computer node device to only the plurality of resources on the approved resource list; and sending via the network the message including the indication to the host node device, wherein the host node device is configured to receive the indication and to update the approved resource list thereby modifying the lock-down community of the computer node device, wherein at least one of the preceding actions is performed on at least one electronic hardware component.

22. The method of claim 21 further comprising receiving utilization information associated with a plurality of computer node devices, analyzing the utilization information, and modifying the lock-down community of the computer node device based on the utilization information.

23. The method of claim 21 wherein the indication to update the approved resource list of the computer node device includes a command to at least one of add the target resource to the approved resource list, remove the target resource from the approved resource list, and replace a first approved resource list associated with a first lock-down community with a second approved resource list comprising the target resource associated with a second lock-down community.

24. The method of claim 23 wherein when the indication to update includes a command to replace the first approved resource list, the method includes generating a second message including an indication to at least one of archive and purge data associated with the first lock-down community, and sending the second message to the host node device.

* * * * *